May 19, 1942.     K. WAIBEL     2,283,476
ELECTRICALLY OPERATED RETRACTABLE AND EXTENSIBLE TELESCOPIC STRUT
Filed Aug. 1, 1939
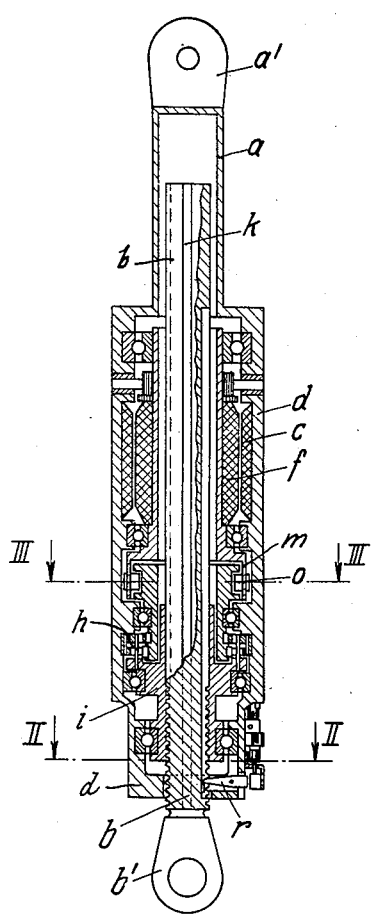
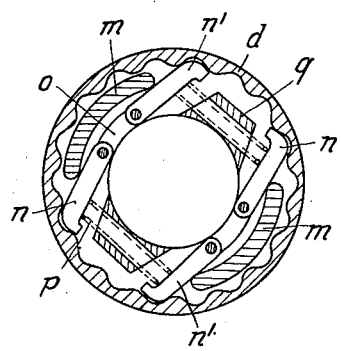
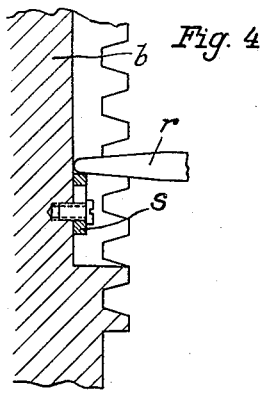
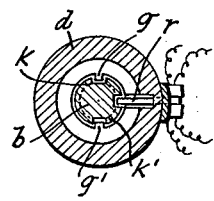
Inventor:
Karl Waibel,
Attorneys Patented May 19, 1942

2,283,476

UNITED STATES PATENT OFFICE 2,283,476

ELECTRICALLY OPERATED RETRACTABLE AND EXTENSIBLE TELESCOPIC STRUT

Karl Waibel, Frankfort-on-the-Main, Germany, assignor to Vereinigte Deutsche Metallwerke Aktiengesellschaft, Frankfort - on - the-Main-Heddernheim, Germany, a corporation of Germany Application August 1, 1939, Serial No. 287,807
In Germany August 6, 1938

2 Claims. (Cl. 254—103)

This invention relates to an electrically operated retractable and extensible telescopic strut for controlling retractable undercarriages, flaps and the like on aircraft. In struts of the foregoing kind, the electric motor has hitherto been disposed separately from the strut and gear wheels, rod work, wire cables and the like being used as transmission members.

The present invention aims at obviating the frequently very cumbersome arrangement of the transmission members, with their numerous fulcrums and abutments.

To this end, according to the invention, the strut is designed to act simultaneously as a carrier for the electric motor.

In such an arrangement the motor can act as an internal or external rotor and is preferably connected co-axially or approximately co-axially with the strut, while its rotation screws the extensible portion of the strut out or in. The high speed of rotation of the driven part of the motor is transmitted to the extensible part of the strut through a reduction gearing.

In order to keep the extended spindle portion completely secure, in any position, against return-shocks in the event of any shaking and vibration, there is interposed, between the motor and the gearing, an automatically acting detent mechanism of known type which permits of displacement only from the motor but restrains reverse movements. The output wheel of the gearing embraces, after the manner of a nut, the portion of the strut which is designed as a screw-spindle and is guided in such a manner as to be incapable of rotation.

In order to keep the dimensions of the strut as small as possible, the gearing is also disposed co-axially and is designed as a rotary gearing such as a cycloid or planetary gear. In the form of a cycloid or planetary gear, in particular, this gearing affords the possibility of keeping the diameter of the strut relatively small.

A strut constructed in accordance with the invention offers the advantage, over the hitherto known separate arrangement of the motor, that the strut forms a self-contained operative member, which can be directly incorporated in all parts of the aircraft requiring such struts and merely requires the electric supply leads. Stationary points of support and rotation are not required.

In addition, the magnitude of the displacement movement can also be very conveniently controlled, since one part or another of the strut is provided with a stop, acting as a switch member for an electrically operated limiting device. Moreover, said stop can be made adjustable or regulable, so that every security for the movement of the strut is provided.

In order to enable the invention to be more readily understood, reference is made to the accompanying drawing, which illustrates diagrammatically and by way of example one embodiment thereof, and in which:

Fig. 1 is a longitudinal section;
Figs. 2 and 3 are cross sections on the lines II—II and III—III respectively of Fig. 1.
Fig. 4 is an enlarged view of a portion of Fig. 1; and
Figs. 5 and 6 are cross sections on the lines V—V and VI—VI respectively of Fig. 3.

The strut consists fundamentally of the two parts $a$ and $b$ adapted to slide one inside the other in telescope fashion, with the customary fastening joints $a'$, $b'$. The electric motor is provided with the outer winding $c$ held by the casing part $d$, and the motor armature $f$, which drives the input wheel of the reduction gear $h$ by way of the detent mechanism to be described below. The reduction gear is here a co-axial cycloid gear, the output wheel $i$ of which is designed as a nut for the screw-spindle part $b$. In this case the screw-spindle $b$ is guided in the strut part $a$ in such a manner as to be incapable of rotation, for example by two guide grooves $k$, $k'$ provided in the spindle in which engage lugs $g$, $g'$ integral with the bottom wall of casing $d$ (Fig. 2).

Fig. 2 shows these grooves in cross-section. The electric motor is controllable in such a manner that it drives the nut $i$ to the left and to the right for the purpose of retracting and extending the strut. If it be required that the strut should be retractable or extensible at different speeds for determined purposes, the electric motor can be arranged in known manner, to run at different rotational speeds for these different working speeds.

Fig. 3 shows a cross-section of the known locking detent mechanism which permits rotary movement from the motor only. All rotary movements from the screw-spindle are completely and reliably checked. The driving part from the motor engages, through bowl-like stops $m$, over the part $o$ of the input wheel of the gear on which are pivoted the pawls $n$, $n'$. The pawls $n$, $n'$ are pressed by compression springs $p$ into the locking position, that is to say into the corresponding depressions in the strut part $d$. By a slight rotation of the stops $m$ in one rotational direction or the other, the pawl n or n' is first disengaged, so that the locking in the initiated direction of rotation is for the time being released, and the bowl-like stops m come to lie in contact, through the pawl n or n' bearing thereagainst, with a fixed part q of the wheel to be driven. The latter is then positively driven. The mode of operation is the same for both directions of rotation. The non-depressed pawl will never produce any resistance in the direction of movement and only bears resiliently against the notches.

The hereindescribed detent mechanism can obviously be replaced by any other suitable double-action locking detent mechanism.

In most cases it is necessary that the strut should be extensible only to a certain extent. To this end, a stop may be provided which interrupts the electric current for the motor in the desired positions of the strut. Thus one part of the strut can carry a tongue r, which is designed directly as a contact for the supply of current (see Fig. 2). The strut part may also operate a contact by its movement. By means of adjustable stops s, the possibility of movement of the strut can be accurately adjusted and adapted to every case.

Having now particularly described and ascertained the nature of our said invention and in what manner the same is to be performed, I declare that what I claim is:

1. In an aircraft having a movable element, an electrically operated retractable and extensible telescopic strut for moving such element, comprising an outer cylindrical member and an inner screw-member, means on said outer and inner members for connecting them to the aircraft and to the movable element respectively, a nut rotatably mounted at one end of said cylindrical member engaging said screw member to screw said screw-member into and out of said cylindrical member, means for preventing the rotation of said screw member, a reduction gearing having a first wheel operatively connected to said nut to drive the same, and a second wheel, an electric motor coaxial with said screw member, a detent mechanism to permit displacement by the motor only, said detent mechanism connecting said second wheel to said motor to be driven thereby.

2. In a strut as claimed in claim 1, including an electric limit device having a switching member mounted on one part of the strut, a stop for the switching member carried by the other part of the strut.

KARL WAIBEL.